(12) United States Patent
Hanley et al.

(10) Patent No.: US 10,412,113 B2
(45) Date of Patent: Sep. 10, 2019

(54) SYSTEMS AND METHODS FOR INTELLIGENTLY CONFIGURING COMPUTER SECURITY

(71) Applicant: Duo Security, Inc., Ann Arbor, MI (US)

(72) Inventors: Michael Hanley, Ann Arbor, MI (US); Olabode Anise, Ann Arbor, MI (US); Kyle Lady, Ann Arbor, MI (US); Jon Oberheide, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 16/215,103

(22) Filed: Dec. 10, 2018

(65) Prior Publication Data

US 2019/0182287 A1 Jun. 13, 2019

Related U.S. Application Data

(60) Provisional application No. 62/596,368, filed on Dec. 8, 2017.

(51) Int. Cl.
*G06F 21/00* (2013.01)
*H04L 29/06* (2006.01)
*G06N 3/08* (2006.01)

(52) U.S. Cl.
CPC .......... *H04L 63/1433* (2013.01); *G06N 3/08* (2013.01); *H04L 63/08* (2013.01); *H04L 63/20* (2013.01)

(58) Field of Classification Search
None
See application file for complete search history.

(56) References Cited

U.S. PATENT DOCUMENTS

| 2,639,997 | A | 5/1953 | Francis |
| 5,754,763 | A | 5/1998 | Bereiter |
| 5,838,792 | A | 11/1998 | Ganesan |

(Continued)

FOREIGN PATENT DOCUMENTS

| WO | 2007075850 A2 | 7/2007 |
| WO | 2014150073 A2 | 9/2014 |

OTHER PUBLICATIONS

"Neuenhofen, Kay, and Mathew Thompson. ""A secure marketplace for mobile java agents."" Proceeding of the second international Conference on Autonomous agents. ACM, 1998. {pp. 212-218)."

(Continued)

*Primary Examiner* — Maung T Lwin
(74) *Attorney, Agent, or Firm* — Jeffrey Schox; Padowithz Alce (57) ABSTRACT

A system and method that enables the configuration of computer security of a subject entity at a computer security platform includes collecting a corpus of security data relating to one or more security configurations of the network maintained by the subject entity, analyzing the corpus of security data to determine one or more vulnerability factors and one or more security behaviors relating to the subject entity, generating a security assessment for the subject entity based on the analysis of the corpus of security data, generating a computer security policy for the security environment based on the security assessment, and providing, to the subject entity, a security policy recommendation incorporating at least a subset of the generated computer security policy.

16 Claims, 5 Drawing Sheets

(56) References Cited

U.S. PATENT DOCUMENTS

| | | | |
|---|---|---|---|
| 5,870,723 A | 2/1999 | Pare et al. |
| 6,119,096 A | 9/2000 | Mann et al. |
| 6,209,091 B1 | 3/2001 | Sudia et al. |
| 6,311,272 B1 | 10/2001 | Gressel |
| 6,662,205 B1 | 12/2003 | Bereiter |
| 6,694,025 B1 | 2/2004 | Epstein et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |
| 6,990,591 B1 * | 1/2006 | Pearson ............... H04L 29/06 726/22 |
| 6,996,716 B1 | 2/2006 | Hsu |
| 7,000,247 B2 | 2/2006 | Banzhof |
| 7,093,133 B2 | 8/2006 | Hopkins et al. |
| 7,096,354 B2 | 8/2006 | Wheeler et al. |
| 7,107,246 B2 | 9/2006 | Wang |
| 7,146,009 B2 | 12/2006 | Andivahis et al. |
| 7,172,115 B2 | 2/2007 | Lauden |
| 7,213,260 B2 | 5/2007 | Judge |
| 7,331,518 B2 | 2/2008 | Rable |
| 7,334,255 B2 | 2/2008 | Lin et al. |
| 7,340,600 B1 | 3/2008 | Corella |
| 7,386,720 B2 | 6/2008 | Sandhu et al. |
| 7,447,784 B2 | 11/2008 | Eun |
| 7,463,637 B2 | 12/2008 | Bou-Diab et al. |
| 7,483,384 B2 | 1/2009 | Bryant et al. |
| 7,496,662 B1 | 2/2009 | Roesch et al. |
| 7,526,792 B2 | 4/2009 | Ross |
| 7,562,382 B2 | 7/2009 | Hinton et al. |
| 7,562,385 B2 | 7/2009 | Thione et al. |
| 7,571,471 B2 | 8/2009 | Sandhu et al. |
| 7,574,733 B2 | 8/2009 | Woodhill |
| 7,599,493 B2 | 10/2009 | Sandhu et al. |
| 7,630,493 B2 | 12/2009 | Sandhu et al. |
| 7,711,122 B2 | 5/2010 | Allen et al. |
| 7,712,137 B2 | 5/2010 | Meier |
| 7,716,240 B2 | 5/2010 | Lim |
| 7,733,803 B2 | 6/2010 | Vogel et al. |
| 7,764,970 B2 | 7/2010 | Neil et al. |
| 7,793,110 B2 | 9/2010 | Durfee et al. |
| 7,836,501 B2 | 11/2010 | Sobel et al. |
| 7,904,608 B2 | 3/2011 | Price |
| 7,953,979 B2 | 5/2011 | Borneman et al. |
| 7,958,362 B2 | 6/2011 | Hwang |
| 7,961,645 B2 | 6/2011 | Gudipudi et al. |
| 7,982,595 B2 | 7/2011 | Hanna et al. |
| 7,983,987 B2 | 7/2011 | Kranzley et al. |
| 8,001,610 B1 | 8/2011 | Chickering et al. |
| 8,010,779 B2 | 8/2011 | Sermersheim et al. |
| 8,028,329 B2 | 9/2011 | Whitcomb |
| 8,099,368 B2 | 1/2012 | Coulter et al. |
| 8,108,933 B2 | 1/2012 | Mahaffey |
| 8,136,148 B1 | 3/2012 | Chayanam et al. |
| 8,141,146 B2 | 3/2012 | Ozeki |
| 8,151,333 B2 | 4/2012 | Zhu et al. |
| 8,161,527 B2 | 4/2012 | Curren |
| 8,181,253 B1 | 5/2012 | Zaitsev et al. |
| 8,185,740 B2 | 5/2012 | Choe et al. |
| 8,185,744 B2 | 5/2012 | Brown et al. |
| 8,185,962 B2 | 5/2012 | Moore |
| 8,200,980 B1 | 6/2012 | Robinson et al. |
| 8,225,392 B2 | 7/2012 | Dubrovsky et al. |
| 8,245,044 B2 | 8/2012 | Kang |
| 8,250,478 B2 | 8/2012 | Dharmarajan et al. |
| 8,259,947 B2 | 9/2012 | Gantman et al. |
| 8,281,401 B2 | 10/2012 | Pennington et al. |
| 8,281,403 B1 | 10/2012 | Asheghian et al. |
| 8,321,437 B2 | 11/2012 | Lim |
| 8,332,627 B1 | 12/2012 | Matthews et al. |
| 8,335,933 B2 | 12/2012 | Humphrey et al. |
| 8,340,287 B2 | 12/2012 | Sandhu et al. |
| 8,340,635 B2 | 12/2012 | Herz et al. |
| 8,380,192 B2 | 2/2013 | Kim et al. |
| 8,381,297 B2 | 2/2013 | Touboul |
| 8,397,212 B2 | 3/2013 | Chijiiwa |
| 8,397,301 B2 | 3/2013 | Hering et al. |
| 8,397,302 B2 | 3/2013 | Mont et al. |
| 8,402,526 B2 | 3/2013 | Ahn |
| 8,418,168 B2 | 4/2013 | Tyhurst et al. |
| 8,458,308 B1 | 6/2013 | Steves |
| 8,458,798 B2 | 6/2013 | Williams et al. |
| 8,484,708 B2 | 7/2013 | Chern |
| 8,495,720 B2 | 7/2013 | Counterman |
| 8,499,149 B2 | 7/2013 | Chen |
| 8,499,339 B2 | 7/2013 | Chao et al. |
| 8,510,820 B2 | 8/2013 | Oberheide et al. |
| 8,522,010 B2 | 8/2013 | Ozzie et al. |
| 8,528,039 B2 | 9/2013 | Chakarapani |
| 8,533,844 B2 | 9/2013 | Mahaffey et al. |
| 8,538,028 B2 | 9/2013 | Goeller et al. |
| 8,539,544 B2 | 9/2013 | Srinivasan et al. |
| 8,539,567 B1 | 9/2013 | Luxemberg et al. |
| 8,548,426 B2 | 10/2013 | Smith |
| 8,549,601 B2 | 10/2013 | Ganesan |
| 8,571,220 B2 | 10/2013 | Ollikainen et al. |
| 8,578,162 B2 | 11/2013 | Jentzsch et al. |
| 8,588,422 B2 | 11/2013 | Beachem et al. |
| 8,595,809 B2 | 11/2013 | Chayanam et al. |
| 8,595,822 B2 | 11/2013 | Schrecker et al. |
| 8,601,554 B2 | 12/2013 | Gordon et al. |
| 8,612,305 B2 | 12/2013 | Dominguez et al. |
| 8,627,438 B1 | 1/2014 | Bhimanaik |
| 8,646,060 B1 | 2/2014 | Ben Ayed |
| 8,646,086 B2 | 2/2014 | Chakra et al. |
| 8,667,288 B2 | 3/2014 | Yavuz |
| 8,689,287 B2 | 4/2014 | Bohmer et al. |
| 8,700,729 B2 | 4/2014 | Dua |
| 8,707,365 B2 | 4/2014 | Corl |
| 8,707,384 B2 | 4/2014 | Jain et al. |
| 8,713,329 B2 | 4/2014 | Schneider |
| 8,713,639 B2 | 4/2014 | Cheeniyil et al. |
| 8,719,930 B2 | 5/2014 | Lapsley et al. |
| 8,732,475 B2 | 5/2014 | Fahrny et al. |
| 8,732,839 B2 | 5/2014 | Hohl |
| 8,737,623 B2 | 5/2014 | Hart |
| 8,745,703 B2 | 6/2014 | Lambert et al. |
| 8,751,801 B2 | 6/2014 | Harris et al. |
| 8,756,651 B2 | 6/2014 | Baer et al. |
| 8,756,698 B2 | 6/2014 | Sidagni |
| 8,763,077 B2 | 6/2014 | Oberheide et al. |
| 8,789,178 B2 | 7/2014 | Kejriwal et al. |
| 8,806,609 B2 | 8/2014 | Gladstone et al. |
| 8,806,638 B1 | 8/2014 | Mani |
| 8,813,228 B2 | 8/2014 | Magee et al. |
| 8,838,759 B1 | 9/2014 | Eatough et al. |
| 8,850,017 B2 | 9/2014 | Ebrahimi et al. |
| 8,850,516 B1 | 9/2014 | Hrebicek et al. |
| 8,850,530 B2 | 9/2014 | Shahbazi |
| 8,862,097 B2 | 10/2014 | Brand et al. |
| 8,891,772 B2 | 11/2014 | D'Souza et al. |
| 8,893,230 B2 | 11/2014 | Oberheide et al. |
| 8,898,762 B2 | 11/2014 | Kang |
| 8,903,365 B2 | 12/2014 | Stricklen et al. |
| 8,910,268 B2 | 12/2014 | Hudis et al. |
| 8,935,769 B2 | 1/2015 | Hessler |
| 8,938,531 B1 | 1/2015 | Cotton et al. |
| 8,938,799 B2 | 1/2015 | Kuo |
| 8,949,596 B2 | 2/2015 | Yin et al. |
| 8,949,927 B2 | 2/2015 | Arnott et al. |
| 8,955,038 B2 | 2/2015 | Nicodemus et al. |
| 8,955,075 B2 | 2/2015 | Von Bokern et al. |
| 8,959,568 B2 | 2/2015 | Hudis et al. |
| 8,966,587 B2 | 2/2015 | Nair et al. |
| 8,984,276 B2 | 3/2015 | Benson et al. |
| 9,037,127 B2 | 5/2015 | Raleigh |
| 9,043,886 B2 | 5/2015 | Srinivasan et al. |
| 9,049,011 B1 | 6/2015 | Agrawal |
| 9,049,594 B2 | 6/2015 | Chen et al. |
| 9,071,611 B2 | 6/2015 | Yadav et al. |
| 9,076,343 B2 | 7/2015 | Chaar et al. |
| 9,077,758 B1 | 7/2015 | McGovern et al. |
| 9,110,754 B2 | 8/2015 | Poonamalli et al. |
| 9,118,656 B2 | 8/2015 | Ting et al. |

(56) References Cited

U.S. PATENT DOCUMENTS

| | | |
|---|---|---|
| 9,122,888 B2 | 9/2015 | Devi |
| 9,124,582 B2 | 9/2015 | Kalinichenko et al. |
| 9,135,458 B1 | 9/2015 | Hankins et al. |
| 9,154,387 B2 | 10/2015 | Maki et al. |
| 9,172,545 B2 | 10/2015 | Edstrom et al. |
| 9,189,491 B2 | 11/2015 | Fushman et al. |
| 9,201,644 B2 | 12/2015 | Klein et al. |
| 9,203,841 B2 | 12/2015 | Neuman et al. |
| 9,210,044 B2 | 12/2015 | Kacin et al. |
| 9,215,234 B2 | 12/2015 | Black |
| 9,223,961 B1 | 12/2015 | Sokolov |
| 9,225,840 B2 | 12/2015 | Malatack et al. |
| 9,253,185 B2 | 2/2016 | Alaranta et al. |
| 9,258,296 B2 | 2/2016 | Juthani |
| 9,264,443 B2 | 2/2016 | Weisman |
| 9,270,674 B2 | 2/2016 | Lang et al. |
| 9,282,085 B2 | 3/2016 | Oberheide et al. |
| 9,338,156 B2 | 5/2016 | Oberheide et al. |
| 9,338,163 B2 | 5/2016 | Wendling et al. |
| 9,338,176 B2 | 5/2016 | Trumbull et al. |
| 9,344,275 B2 | 5/2016 | Bar-El et al. |
| 9,349,000 B2 | 5/2016 | Du et al. |
| 9,374,654 B2 | 6/2016 | Lindeman et al. |
| 9,386,003 B2 | 7/2016 | Kumar |
| 9,391,980 B1 | 7/2016 | Krahn et al. |
| 9,397,892 B2 | 7/2016 | Kirner et al. |
| 9,411,963 B2 | 8/2016 | Robke et al. |
| 9,430,938 B2 | 8/2016 | Proud |
| 9,443,073 B2 | 9/2016 | Oberheide et al. |
| 9,443,084 B2 | 9/2016 | Nice et al. |
| 9,454,365 B2 | 9/2016 | Oberheide et al. |
| 9,467,463 B2 | 10/2016 | Oberheide et al. |
| 9,479,509 B2 | 10/2016 | Zeuthen |
| 9,491,189 B2 | 11/2016 | Zeitlin et al. |
| 9,501,315 B2 | 11/2016 | Desai et al. |
| 9,544,143 B2 | 1/2017 | Oberheide et al. |
| 9,607,155 B2 | 3/2017 | Beresnevichiene et al. |
| 9,619,307 B2 | 4/2017 | Maltese et al. |
| 9,635,041 B1 | 4/2017 | Warman et al. |
| 9,659,160 B2 | 5/2017 | Ligatti et al. |
| 9,668,137 B2 | 5/2017 | Sigurdson et al. |
| 9,680,864 B2 | 6/2017 | Khesin |
| 9,706,410 B2 | 7/2017 | Sreenivas et al. |
| 9,723,019 B1 | 8/2017 | Rathor |
| 9,754,097 B2 | 9/2017 | Hessler |
| 9,762,429 B2 | 9/2017 | Elmaliah |
| 9,769,538 B2 | 9/2017 | Killick |
| 9,832,221 B1 | 11/2017 | Newstadt et al. |
| 9,918,226 B2 | 3/2018 | Khan |
| 9,940,119 B2 | 4/2018 | Brownell et al. |
| 9,996,343 B2 | 6/2018 | Oberheide et al. |
| 2002/0013898 A1 | 1/2002 | Sudia et al. |
| 2002/0091745 A1 | 7/2002 | Ramamurthy et al. |
| 2002/0123967 A1 | 9/2002 | Wang |
| 2002/0131404 A1 | 9/2002 | Mehta et al. |
| 2002/0136410 A1 | 9/2002 | Hanna |
| 2003/0011545 A1 | 1/2003 | Sagano et al. |
| 2003/0012093 A1 | 1/2003 | Tada et al. |
| 2003/0061506 A1 | 3/2003 | Cooper et al. |
| 2003/0115452 A1 | 6/2003 | Sandhu et al. |
| 2003/0120931 A1 | 6/2003 | Hopkins et al. |
| 2003/0126472 A1 | 7/2003 | Banzhof |
| 2003/0147536 A1 | 8/2003 | Andivahis et al. |
| 2003/0149781 A1 | 8/2003 | Yared et al. |
| 2003/0172291 A1 | 9/2003 | Judge et al. |
| 2004/0064706 A1 | 4/2004 | Lin et al. |
| 2004/0139318 A1 | 7/2004 | Fiala et al. |
| 2004/0187018 A1 | 9/2004 | Owen et al. |
| 2004/0215672 A1 | 10/2004 | Pfitzner |
| 2004/0218763 A1 | 11/2004 | Gantman et al. |
| 2005/0024052 A1 | 2/2005 | Bendall et al. |
| 2005/0097350 A1 | 5/2005 | Patrick et al. |
| 2005/0097352 A1 | 5/2005 | Patrick et al. |
| 2005/0218215 A1 | 10/2005 | Lauden |
| 2005/0221268 A1 | 10/2005 | Chaar et al. |
| 2005/0240522 A1 | 10/2005 | Kranzley et al. |
| 2005/0268107 A1 | 12/2005 | Harris et al. |
| 2005/0268326 A1* | 12/2005 | Bhargavan ............ H04L 63/102 726/1 |
| 2005/0278777 A1 | 12/2005 | Loza |
| 2006/0021018 A1 | 1/2006 | Hinton et al. |
| 2006/0024269 A1 | 2/2006 | Doyle et al. |
| 2006/0026304 A1 | 2/2006 | Price |
| 2006/0031938 A1 | 2/2006 | Choi |
| 2006/0059569 A1 | 3/2006 | Dasgupta et al. |
| 2006/0075475 A1 | 4/2006 | Boulos et al. |
| 2006/0101519 A1 | 5/2006 | Lasswell et al. |
| 2006/0130139 A1 | 6/2006 | Sobel et al. |
| 2006/0165060 A1 | 7/2006 | Dua |
| 2006/0182276 A1 | 8/2006 | Sandhu et al. |
| 2006/0184787 A1 | 8/2006 | Sandhu et al. |
| 2006/0184788 A1 | 8/2006 | Sandhu et al. |
| 2006/0195588 A1 | 8/2006 | Pennington et al. |
| 2006/0242692 A1 | 10/2006 | Thione et al. |
| 2007/0016948 A1 | 1/2007 | Dubrovsky et al. |
| 2007/0027961 A1 | 2/2007 | Holzer |
| 2007/0033148 A1 | 2/2007 | Cahill |
| 2007/0081667 A1 | 4/2007 | Hwang |
| 2007/0101145 A1 | 5/2007 | Sachdeva et al. |
| 2007/0143860 A1 | 6/2007 | Hardt |
| 2007/0156592 A1 | 7/2007 | Henderson |
| 2007/0156659 A1 | 7/2007 | Lim |
| 2007/0180490 A1 | 8/2007 | Renzi et al. |
| 2007/0185978 A1 | 8/2007 | Montulli |
| 2007/0186106 A1 | 8/2007 | Ting et al. |
| 2007/0199060 A1 | 8/2007 | Touboul |
| 2007/0204016 A1 | 8/2007 | Kunz et al. |
| 2007/0204346 A1 | 8/2007 | Meier |
| 2007/0228148 A1 | 10/2007 | Rable |
| 2007/0250914 A1 | 10/2007 | Fazal et al. |
| 2007/0254631 A1 | 11/2007 | Spooner |
| 2007/0258594 A1 | 11/2007 | Sandhu et al. |
| 2007/0284429 A1 | 12/2007 | Beeman |
| 2007/0297607 A1 | 12/2007 | Ogura et al. |
| 2008/0004964 A1 | 1/2008 | Messa et al. |
| 2008/0010665 A1 | 1/2008 | Hinton et al. |
| 2008/0012041 A1 | 1/2008 | Kesler |
| 2008/0034413 A1 | 2/2008 | He et al. |
| 2008/0049642 A1 | 2/2008 | Gudipudi et al. |
| 2008/0059804 A1 | 3/2008 | Shah et al. |
| 2008/0069347 A1 | 3/2008 | Brown et al. |
| 2008/0120411 A1 | 5/2008 | Eberle |
| 2008/0134311 A1 | 6/2008 | Medvinsky et al. |
| 2008/0198856 A1 | 8/2008 | Vogel et al. |
| 2008/0201186 A1 | 8/2008 | Poon et al. |
| 2008/0215675 A1 | 9/2008 | Kaminitz et al. |
| 2008/0229104 A1 | 9/2008 | Ju et al. |
| 2008/0301669 A1 | 12/2008 | Rao et al. |
| 2009/0055906 A1 | 2/2009 | Von |
| 2009/0077060 A1 | 3/2009 | Sermersheim et al. |
| 2009/0083225 A1 | 3/2009 | Jacobs et al. |
| 2009/0167489 A1 | 7/2009 | Nan et al. |
| 2009/0177675 A1 | 7/2009 | Trumbull et al. |
| 2009/0187986 A1 | 7/2009 | Ozeki |
| 2009/0198997 A1 | 8/2009 | Yeap et al. |
| 2009/0210705 A1 | 8/2009 | Chen |
| 2009/0254978 A1 | 10/2009 | Rouskov et al. |
| 2009/0259848 A1 | 10/2009 | Williams et al. |
| 2009/0271863 A1 | 10/2009 | Govindavajhala et al. |
| 2009/0300596 A1 | 12/2009 | Tyhurst et al. |
| 2009/0300707 A1 | 12/2009 | Garimella et al. |
| 2009/0328178 A1 | 12/2009 | McDaniel et al. |
| 2010/0002378 A1 | 1/2010 | Chen et al. |
| 2010/0011433 A1* | 1/2010 | Harrison ............ H04L 63/0263 726/12 |
| 2010/0018000 A1 | 1/2010 | Hsu |
| 2010/0023781 A1 | 1/2010 | Nakamoto |
| 2010/0026302 A1 | 2/2010 | Doty et al. |
| 2010/0036931 A1 | 2/2010 | Certain et al. |
| 2010/0042954 A1 | 2/2010 | Rosenblatt et al. |
| 2010/0050263 A1 | 2/2010 | Weisman |
| 2010/0069104 A1 | 3/2010 | Neil et al. |
| 2010/0100725 A1 | 4/2010 | Ozzie et al. |
| 2010/0100924 A1 | 4/2010 | Hinton |

(56) References Cited

U.S. PATENT DOCUMENTS

| | | |
|---|---|---|
| 2010/0100963 A1 | 4/2010 | Mahaffey |
| 2010/0107225 A1 | 4/2010 | Spencer et al. |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0125737 A1 | 5/2010 | Kang |
| 2010/0131755 A1 | 5/2010 | Zhu et al. |
| 2010/0180001 A1 | 7/2010 | Hardt |
| 2010/0186082 A1 | 7/2010 | Ladki et al. |
| 2010/0202609 A1 | 8/2010 | Sandhu et al. |
| 2010/0216425 A1 | 8/2010 | Smith |
| 2010/0217986 A1 | 8/2010 | Schneider |
| 2010/0233996 A1 | 9/2010 | Herz et al. |
| 2010/0257610 A1 | 10/2010 | Hohl |
| 2010/0263021 A1 | 10/2010 | Arnott et al. |
| 2010/0263046 A1 | 10/2010 | Polavarapu |
| 2010/0274859 A1 | 10/2010 | Bucuk |
| 2010/0319068 A1 | 12/2010 | Abbadessa et al. |
| 2010/0330969 A1 | 12/2010 | Kim et al. |
| 2011/0026716 A1 | 2/2011 | Tang et al. |
| 2011/0047597 A1 | 2/2011 | Barton et al. |
| 2011/0055903 A1 | 3/2011 | Leggette |
| 2011/0086616 A1 | 4/2011 | Brand et al. |
| 2011/0107389 A1 | 5/2011 | Chakarapani |
| 2011/0113484 A1 | 5/2011 | Zeuthen |
| 2011/0119765 A1 | 5/2011 | Hering et al. |
| 2011/0138469 A1 | 6/2011 | Ye et al. |
| 2011/0145900 A1 | 6/2011 | Chern |
| 2011/0179472 A1 | 7/2011 | Ganesan |
| 2011/0185287 A1 | 7/2011 | Dharmarajan et al. |
| 2011/0185431 A1 | 7/2011 | Deraison |
| 2011/0197266 A1 | 8/2011 | Chu et al. |
| 2011/0197267 A1 | 8/2011 | Gravel et al. |
| 2011/0219449 A1 | 9/2011 | St et al. |
| 2011/0225637 A1 | 9/2011 | Counterman |
| 2011/0231265 A1 | 9/2011 | Brown et al. |
| 2011/0277025 A1 | 11/2011 | Counterman |
| 2011/0277034 A1 | 11/2011 | Hanson |
| 2011/0282908 A1 | 11/2011 | Fly et al. |
| 2011/0289582 A1 | 11/2011 | Kejriwal et al. |
| 2011/0302410 A1 | 12/2011 | Clarke et al. |
| 2011/0302630 A1 | 12/2011 | Nair et al. |
| 2012/0029084 A1 | 2/2012 | Wong |
| 2012/0030093 A1 | 2/2012 | Farias |
| 2012/0060360 A1 | 3/2012 | Liu |
| 2012/0063601 A1 | 3/2012 | Hart |
| 2012/0090028 A1 | 4/2012 | Lapsley et al. |
| 2012/0096274 A1 | 4/2012 | Campagna et al. |
| 2012/0110671 A1 | 5/2012 | Beresnevichiene et al. |
| 2012/0117229 A1 | 5/2012 | Van et al. |
| 2012/0117626 A1 | 5/2012 | Yates et al. |
| 2012/0151567 A1 | 6/2012 | Chayanam et al. |
| 2012/0159600 A1 | 6/2012 | Takagi |
| 2012/0198050 A1 | 8/2012 | Maki et al. |
| 2012/0198228 A1 | 8/2012 | Oberheide et al. |
| 2012/0216239 A1 | 8/2012 | Yadav et al. |
| 2012/0227098 A1 | 9/2012 | Obasanjo et al. |
| 2012/0254957 A1 | 10/2012 | Fork et al. |
| 2012/0278454 A1 | 11/2012 | Stewart et al. |
| 2012/0290841 A1 | 11/2012 | Jentzsch |
| 2012/0300931 A1 | 11/2012 | Ollikainen et al. |
| 2012/0317287 A1 | 12/2012 | Amitai et al. |
| 2012/0321086 A1 | 12/2012 | D'Souza et al. |
| 2012/0323950 A1 | 12/2012 | Wilson et al. |
| 2013/0004200 A1 | 1/2013 | Okabe |
| 2013/0007848 A1 | 1/2013 | Chaskar et al. |
| 2013/0008110 A1 | 1/2013 | Rothwell |
| 2013/0012429 A1 | 1/2013 | Eddowes et al. |
| 2013/0017968 A1 | 1/2013 | Gurtner et al. |
| 2013/0024628 A1 | 1/2013 | Benhase et al. |
| 2013/0042002 A1 | 2/2013 | Cheeniyil et al. |
| 2013/0055233 A1 | 2/2013 | Hatton et al. |
| 2013/0055247 A1 | 2/2013 | Hiltgen et al. |
| 2013/0055289 A1 | 2/2013 | Maltese et al. |
| 2013/0060708 A1 | 3/2013 | Oskolkov et al. |
| 2013/0067538 A1 | 3/2013 | Dharmarajan et al. |
| 2013/0074601 A1 | 3/2013 | Jackson |
| 2013/0081101 A1 | 3/2013 | Baer et al. |
| 2013/0086210 A1 | 4/2013 | Yiu et al. |
| 2013/0086658 A1 | 4/2013 | Kottahachchi et al. |
| 2013/0091544 A1* | 4/2013 | Oberheide ............ G06F 21/34 726/1 |
| 2013/0097585 A1 | 4/2013 | Jentsch et al. |
| 2013/0110676 A1 | 5/2013 | Kobres |
| 2013/0117826 A1 | 5/2013 | Gordon et al. |
| 2013/0124292 A1 | 5/2013 | Juthani |
| 2013/0125226 A1 | 5/2013 | Shah et al. |
| 2013/0174246 A1 | 7/2013 | Schrecker et al. |
| 2013/0179681 A1 | 7/2013 | Benson et al. |
| 2013/0239167 A1 | 9/2013 | Sreenivas et al. |
| 2013/0239168 A1 | 9/2013 | Sreenivas et al. |
| 2013/0239177 A1 | 9/2013 | Sigurdson et al. |
| 2013/0246281 A1 | 9/2013 | Yamada et al. |
| 2013/0263211 A1 | 10/2013 | Neuman et al. |
| 2013/0276142 A1 | 10/2013 | Peddada |
| 2013/0310006 A1 | 11/2013 | Chen et al. |
| 2013/0311776 A1 | 11/2013 | Besehanic |
| 2013/0326224 A1 | 12/2013 | Yavuz |
| 2013/0326493 A1 | 12/2013 | Poonamalli et al. |
| 2014/0001975 A1 | 1/2014 | Lee et al. |
| 2014/0007238 A1 | 1/2014 | Magee et al. |
| 2014/0019752 A1 | 1/2014 | Yin et al. |
| 2014/0020051 A1 | 1/2014 | Lu et al. |
| 2014/0020184 A1 | 1/2014 | Loth |
| 2014/0047546 A1 | 2/2014 | Sidagni |
| 2014/0181517 A1 | 6/2014 | Alaranta et al. |
| 2014/0181520 A1 | 6/2014 | Wendling et al. |
| 2014/0188796 A1 | 7/2014 | Fushman et al. |
| 2014/0189863 A1 | 7/2014 | Rorabaugh et al. |
| 2014/0201841 A1 | 7/2014 | Deshpande et al. |
| 2014/0208405 A1 | 7/2014 | Hashai |
| 2014/0235230 A1 | 8/2014 | Raleigh |
| 2014/0237236 A1 | 8/2014 | Kalinichenko et al. |
| 2014/0244993 A1 | 8/2014 | Chew |
| 2014/0245278 A1 | 8/2014 | Zellen |
| 2014/0245396 A1 | 8/2014 | Oberheide et al. |
| 2014/0247140 A1 | 9/2014 | Proud |
| 2014/0297840 A1 | 10/2014 | Qureshi |
| 2014/0310415 A1 | 10/2014 | Kirner et al. |
| 2014/0351954 A1 | 11/2014 | Brownell et al. |
| 2014/0376543 A1 | 12/2014 | Malatack et al. |
| 2015/0002646 A1 | 1/2015 | Namii |
| 2015/0012914 A1 | 1/2015 | Klein et al. |
| 2015/0026461 A1 | 1/2015 | Devi |
| 2015/0040194 A1 | 2/2015 | Chaskar et al. |
| 2015/0058983 A1 | 2/2015 | Zeitlin et al. |
| 2015/0163121 A1 | 6/2015 | Mahaffey et al. |
| 2015/0172321 A1* | 6/2015 | Kirti ............... H04L 63/20 726/1 |
| 2015/0213259 A1 | 7/2015 | Du et al. |
| 2015/0213268 A1 | 7/2015 | Nance et al. |
| 2015/0237026 A1 | 8/2015 | Kumar |
| 2015/0242643 A1 | 8/2015 | Hankins et al. |
| 2015/0261955 A1 | 9/2015 | Huang et al. |
| 2015/0281318 A1 | 10/2015 | Warner et al. |
| 2015/0304351 A1 | 10/2015 | Oberheide et al. |
| 2015/0312233 A1 | 10/2015 | Graham et al. |
| 2015/0381662 A1* | 12/2015 | Nair ............... H04L 63/20 726/1 |
| 2016/0005696 A1 | 1/2016 | Tomohiro |
| 2016/0018007 A1 | 1/2016 | Eckholz |
| 2016/0021117 A1 | 1/2016 | Harmon et al. |
| 2016/0028639 A1 | 1/2016 | Wong et al. |
| 2016/0030023 A1 | 2/2016 | Hayakawa et al. |
| 2016/0056962 A1 | 2/2016 | Mehtälä |
| 2016/0080366 A1 | 3/2016 | Agarwal |
| 2016/0099963 A1* | 4/2016 | Mahaffey ............ H04L 63/0227 726/25 |
| 2016/0164866 A1 | 6/2016 | Oberheide et al. |
| 2016/0180072 A1 | 6/2016 | Ligatti et al. |
| 2016/0180343 A1 | 6/2016 | Poon et al. |
| 2016/0212129 A1 | 7/2016 | Johnston et al. |
| 2016/0286391 A1 | 9/2016 | Khan |
| 2016/0300231 A1 | 10/2016 | Shavell et al. |

(56) References Cited

U.S. PATENT DOCUMENTS

| | | | |
|---|---|---|---|
| 2016/0314301 A1 | 10/2016 | Johns et al. | |
| 2016/0366589 A1 | 12/2016 | Jean | |
| 2017/0039242 A1 | 2/2017 | Milton et al. | |
| 2017/0046519 A1 | 2/2017 | Cam | |
| 2017/0169066 A1 | 6/2017 | Mantri et al. | |
| 2017/0214701 A1* | 7/2017 | Hasan | H04L 63/1408 |
| 2018/0027006 A1* | 1/2018 | Zimmermann | H04L 63/0245 726/11 |
| 2018/0205726 A1* | 7/2018 | Chari | H04L 63/0861 |

OTHER PUBLICATIONS

"Symantec, Administration guide for symantec Endpoint protection and symantec network access control, 2009, version 11.00.05.00.00".

"Symantec, Administration Guide for Symantec TM Endpoint Protection and Symantec Network Access Control, Aug. 1, 2007".

Stone-Gross, Brett, et al., "Peering Through the iFrame", INFOCOM Proceeding, IEEE, Apr. 10-15, 2011, pp. 111-415.

Yao, Qiong, et al.,"Effective Iframe-based Strategy for Processing Dynamic Data in Embedded Browser", International Conference on Advanced Computer Theory and Engineering (ICACTE), IEEE, Dec. 20-22, 2008, pp. 538-542.

"Simske et al., "APEX: Automated Policy Enforcement eXchange", Sep. 21-24, 2010, ACM, pp. 139-142."

"Kher Vishal; et al. "Securing distributed storage: challenges, techniques and systems." Proceedings of the 2005 ACM workshop on Storage security and survivability. ACM, 2005, pp. 9-25.", Feb. 6, 2018 00:00:00.0.

"Goldfeder et al., Securing Bitcoin wallets via a new DSA/ECDSA threshold signature scheme, http://www.cs.princeton.edu/~stevenag/threshold_sigs.pdf".

"Edge, Kenneth, et al. "The use of attack and protection trees to analyze security for an online banking system." System Sciences, 2007. HICSS 2007. 40th Annual Hawaii International Conference on. IEEE, 2007."

"Aloul S Zahidi; et al. "Two factor authentication using mobile phones," 2009 IEEE/ACS International Conference on Computer Systems and Applications, Rabat, 2009, pp. 641-644.", Feb. 6, 2018 00:00:00.0.

"Bonneau Joseph; et al. "Passwords and the evolution of imperfect authentication." Communications of the ACM 58.7 (2015): 78-87.", Feb. 6, 2018 00:00:00.0.

* cited by examiner

FIGURE 1

MONITORING SECURITY ENVIRONMENT S210

COLLECTING SECURITY DATA S220

AUGMENTING SECURITY DATA S225

ANALYZING SECURITY DATA S230

GENERATING A SECURITY ASSESSMENT S240

GENERATING A SECURITY POLICY S250

PROVIDING A SECURITY POLICY RECOMMENDATION S260

IMPLEMENTING SECURITY POLICY S270

FIGURE 2

FIGURE 3 https://marvelapp.com/25g6c71/screen/17041095

- Policies — 40
- Applications — 356
- Users — 560
- Endpoints — 23
- 2FA Devices — 497
- Groups — 53
- Administrators — 123
- Reports
- Accounts
- Settings
- Billing Support
Need help? Email Support
or call 1-855-386-2884

Account ID
DAZ2J5J2R8L9AHLAGRNL

Deployment ID
DUOALPHA

Helpful Links 0 comments

Today we are going to set up your first policy

Before getting started here are the general areas we will aks questions about:

① how phones are used in your environment

② work locations

③ operating systems that you use

④ plugins that are allowed

⑤ browsers that are permitted

GET STARTED

SYSTEMS AND METHODS FOR INTELLIGENTLY CONFIGURING COMPUTER SECURITY

CROSS-REFERENCE TO RELATED APPLICATIONS

This application claims priority to U.S. Provisional Application Ser. No. 62/596,368, filed 8 Dec. 2017, which is incorporated in its entirety by this reference.

Systems and methods disclosed herein can, in variants, incorporate or use the systems and/or methods disclosed in U.S. application Ser. No. 14/271,258 filed 6 May 2014, U.S. application Ser. No. 15/975,968 filed 10 May 2018, and U.S. application Ser. No. 15/896,382 filed 14 Feb. 2018, each of which are incorporated in their entirety by this reference.

TECHNICAL FIELD

One or more of the inventions described herein generally relate to the computer security field, and more specifically to a new and useful system and method for intelligently configuring security of a network in the computer security field.

BACKGROUND

Computer network and data security continue as ongoing concerns of high importance to entities and organizations of all types and sizes. However, identifying optimal computer and network security configurations and computer security policy is highly challenging given the rapidly evolving nature of computer security threats and given the disparate and varying computer networks/system architectures implemented by many entities and organizations. Accordingly, computer security strategy must be varied and diverse to protect against exploitation of computer security vulnerabilities of an entity.

While many complicated security solutions may exist in the market that address some computer security concerns of some entities and organizations, these security solutions are often technically difficult to implement and may additionally require teams of professionals to dissect and implement into an existing computer network and system architecture.

Additionally, compounding the computer security issues facing many of these entities and organizations is a limited availability of computer security resources. Specifically, a shortage of skilled security professionals capable of interpreting and implementing existing but highly complicated security solutions further strains an ability of entities and organizations to deploy effective computer security strategy.

Thus, there is a need in the computer security field to create new and useful methods for determining and deploying effective computer security strategy and computer security policy. The inventions described herein provide such new and useful methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Intelligently Configuring Computer Security

Figure 1:
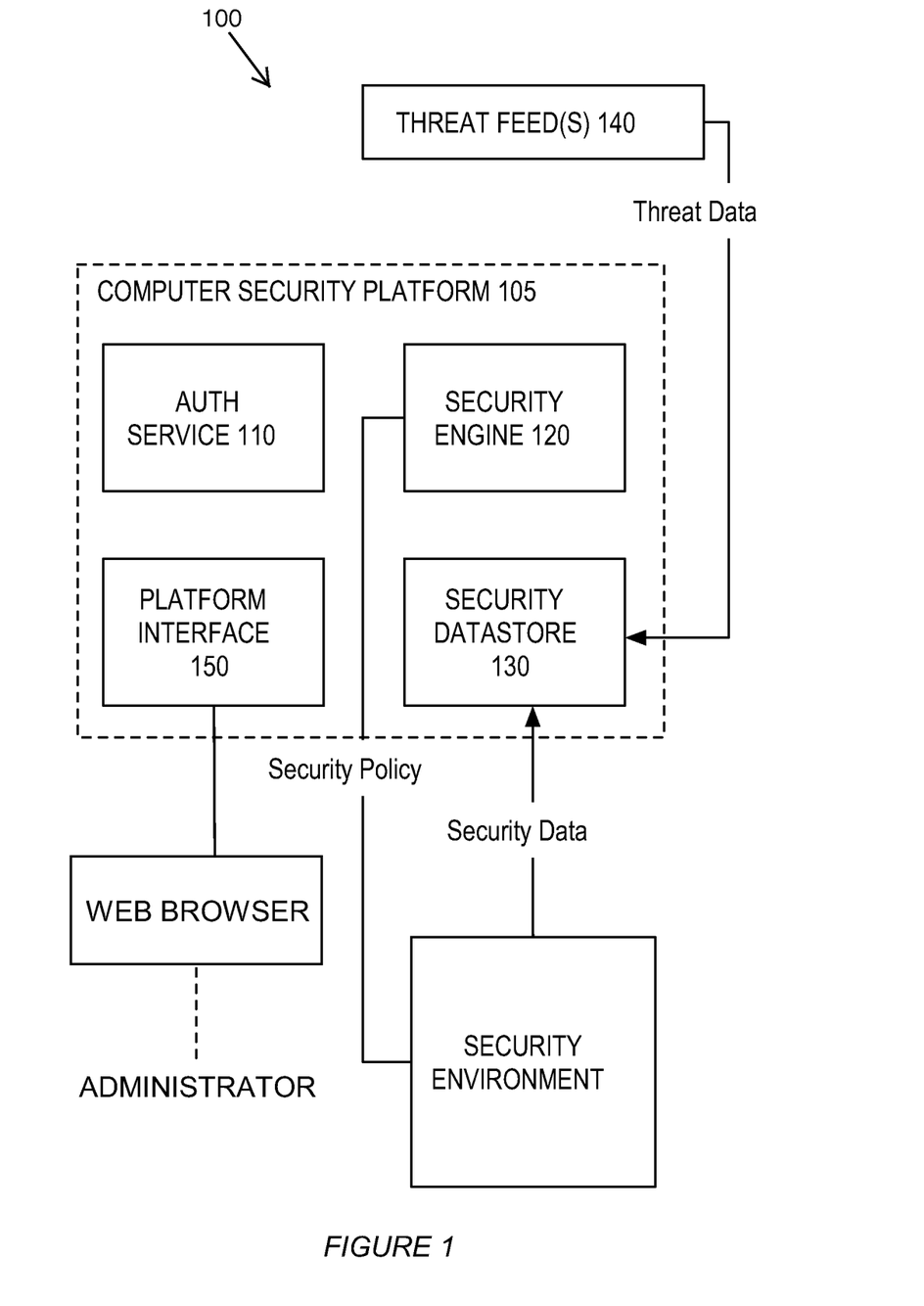
FIG. 1 illustrates a schematic representation of a system 100 in accordance with one or more embodiments of the present application.

As shown in FIG. 1, a system 100 for intelligently configuring computer security includes a centralized and intelligent computer security platform 105 a multi-factor authentication service 110, a computer security engine 120, a security environment datastore 130, digital threat intelligence feeds 140, and a platform interface 150.

The centralized and intelligent computer security platform 105 (hereinafter "computer security platform") is a platform for implementing and maintaining security for one or more entities. The computer security platform 105 may implement authentication services and other cyber security services. In some embodiments, the authentication services include multi-factor authentication services. In a preferred embodiment, one or more aspects of the computer security platform 105 may be enabled by a web-based software platform (e.g., the intelligent computer security platform) operable on a web server or distributed computing system. One or more entities may access the computer security platform to utilize the services of the platform. Entities can includes organizations such as companies, individuals, administrators, hosting or service providers, and any other entities in need of computer security services. In some embodiments, the computer security platform 105 provides a user interface for entities to access services, configure services and policies, take actions relating to security, receive alerts and notifications relating to security of systems, and more. A subject entity is an entity that the computer security platform 105 enables, implements, and/or enables computer security for according to the systems and methods described herein. Additional subject entities may include other entities whose global or aggregate data may be employed within the computer security platform 105 as part of a corpus of security data.

The multi-factor authentication system 100, of a preferred embodiment, functions to facilitate a second factor (or additional factor, two-factor authentication, etc.)) of authentication as a service to one or more service providers.

Figure 3:
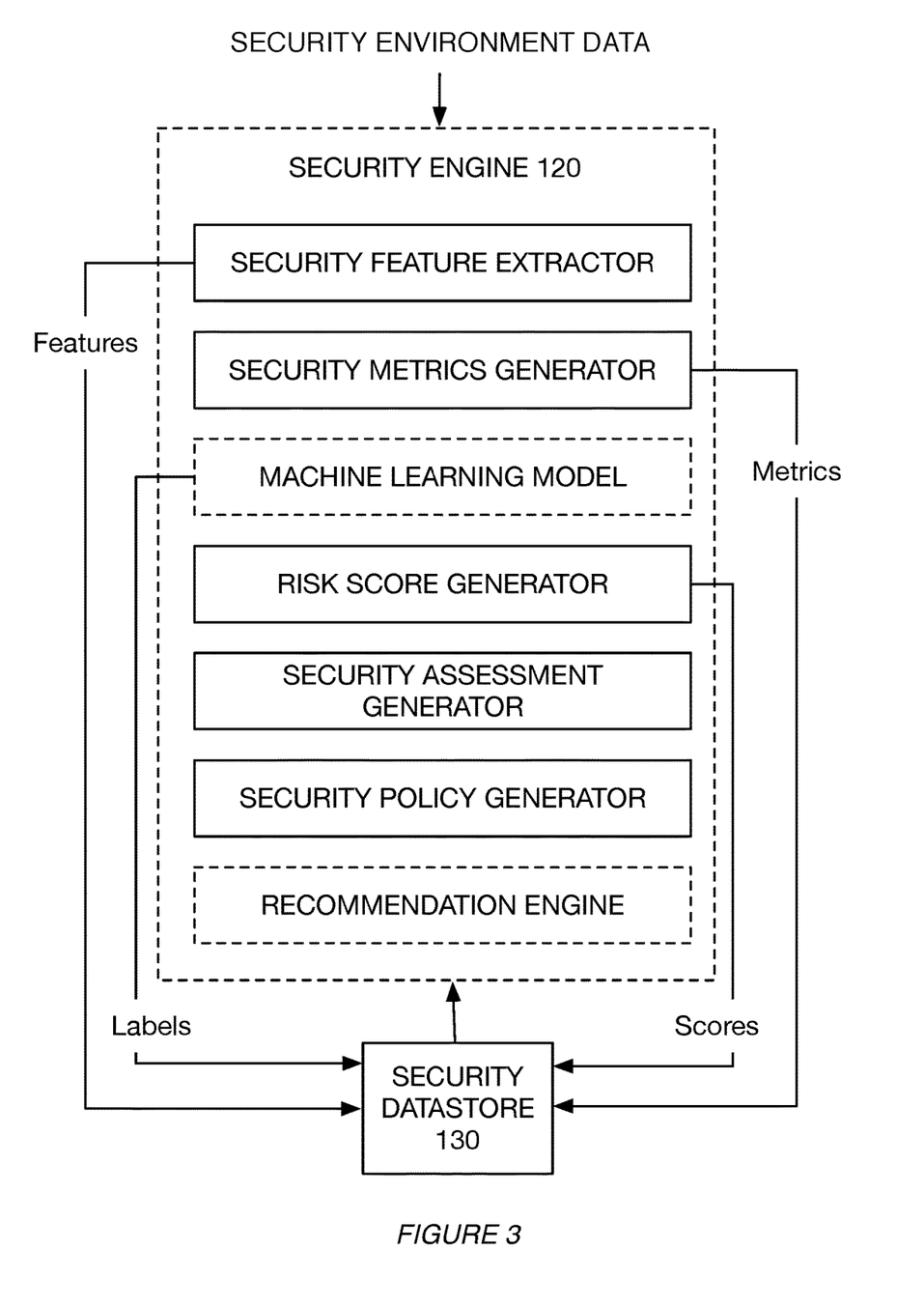
FIG. 3 illustrates a schematic representation of a security engine of a system 100 in accordance with one or more embodiments of the present application.

The computer security engine 120 of a preferred embodiment may be enabled by one or more computing servers programmed to ingest data from a security environment of a subject entity and generate an assessment of the security environment that preferably includes one or more recommendations for computer security policy and/or computer security configurations for the security environment. As shown in FIG. 3 by way of example, the computer security engine 120 of a preferred embodiment of the present application may include a security feature extractor, a security metrics generator, a machine learning model, a risk score generator, a security assessment generator, a security policy generator, and/or a recommendation engine.

The security environment datastore 130 of a preferred embodiment may include one or more databases in which security environment data collected from various entities may be stored. In one implementation, the security environment datastore 130 may include a security environment databank for storing security environment data during an assessment of a security environment of a subject entity.

The threat intelligence feeds 140 may include one or more external feeds of security threat data relating to one or more industries of one or more entities subscribed to a security service of the intelligent computer security platform 105. Additionally, the threat intelligence feeds 140 may include any type or kind computer security or digital security threat data or intelligence describing current and emerging threats to computer and/or digital security.

The platform interface 150 preferably includes a web interface enabled by one or more computing services of the intelligent computer security platform 105. In a preferred embodiment, the platform interface 150 enables an administrator of a remote entity to interact with and make requests of the intelligent computer security platform 105. Additionally, or alternatively, the platform interface 150 may function to deploy a security dashboard that may include a security assessment identifying a security posture of a subject entity together with curated recommendations for computer security policy and/or computer security configurations.

2. Method for Intelligently Configuring Computer Security

Figure 2:
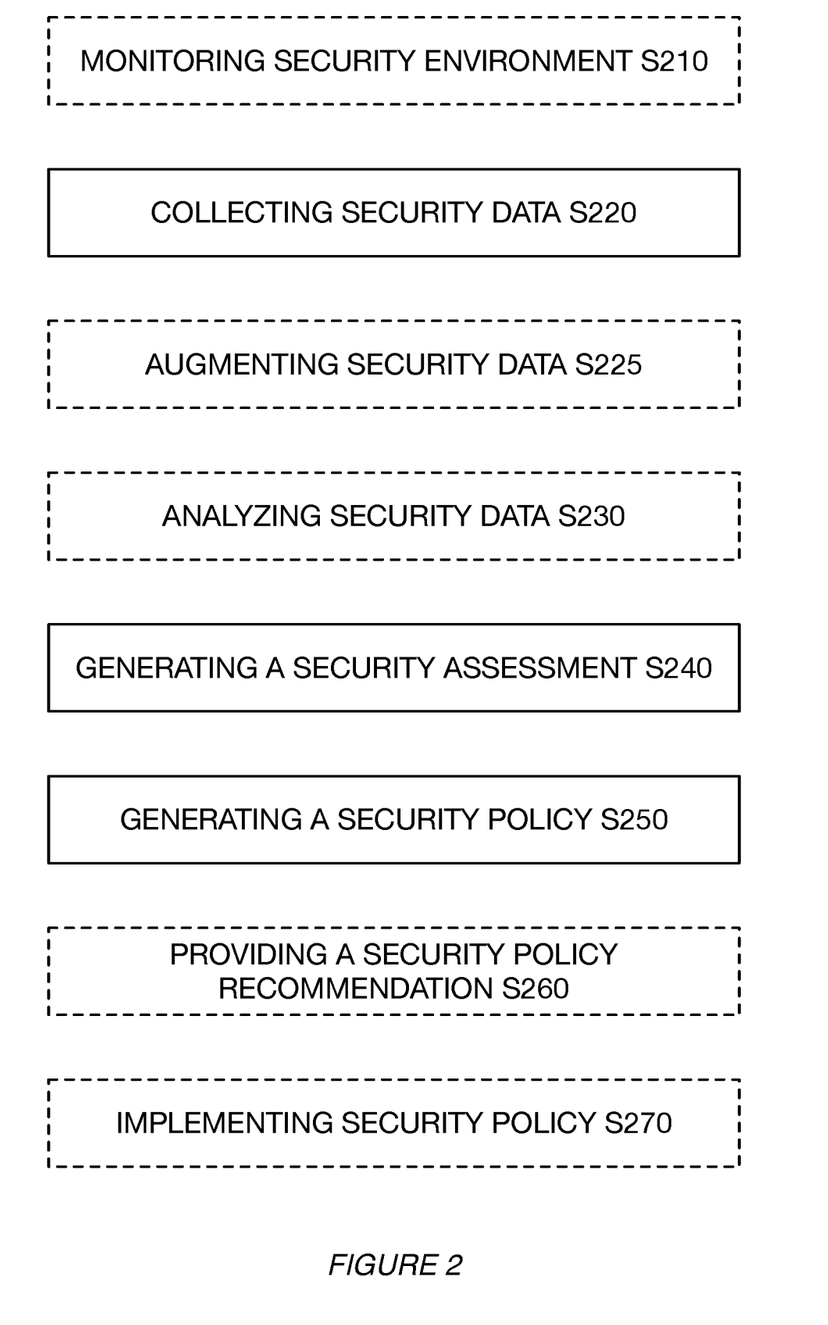
FIG. 2 illustrates a schematic representation of a method in accordance with one or more embodiments of the present application.

As shown in FIG. 2, a method 200 for intelligently configuring computer security of an entity includes collecting a corpus of security data S220, analyzing the security data S230, generating a security assessment of the corpus of security data of the subject entity S240, and generating computer security policy and computer security system configurations S250. The method 200 optionally includes monitoring a security environment of a subject entity S210, augmenting the security environment data with additional security data S225, providing a security policy recommendation S260, and/or implementing the computer security policy S270.

The method 200 functions to simplify for network administrators the configuring of computer security features and determining of computer security policy. The method 200 provides a sophisticated and intelligent computer security platform that functions to ingest (automatically, in some embodiments) security data, including security environment data (or sometimes as referred herein as computer environment data) for a subject entity and uses the security data to generate entity-specific computer security configurations and computer security policy based on a determined current state of computer security for the subject entity.

In some embodiments, the method 200 is enabled by a web-based software platform (e.g., the intelligent computer security platform) operable on a web server or distributed computing system. Additionally, or alternatively, the method 200 may be performed by any suitable computer system capable of ingesting security data, performing a security assessment of a security environment, and generating proposed computer security configurations and computer security policy and optionally implementing the same.

S210 includes monitoring a security environment maintained by the subject entity. In some embodiments, a security environment is a computer environment maintained by the subject entity. In some embodiments, the security environment is a computer network maintained and deployed by the subject entity. In some embodiments, monitoring includes the monitoring of authentication activity within the security environment. In some embodiments, the computer security platform connects to a security environment of the subject entity, such as a network environment, and monitors various aspects of the security environment. In some embodiments, the computer security platform has permission and access rights to various elements of the security environment, and is authenticated in a secure fashion.

S220 includes collecting a corpus of security data, and functions to identify and/or collect security data of a subject entity. In some embodiments, S220 includes collecting security environment data relating to one or more security configurations of the network maintained by the subject entity. However, the security data can include any other suitable data (e.g., device information, work locations, operating systems used, applications or programs used, risk tolerance data, historic configurations, authentication data, historic security data, etc.). The security environment data preferably includes data relating to security configurations and uses of a security environment such as a network maintained and/or deployed by the entity, computers accessing and/or using the network (e.g., endpoints), digital resources (e.g., software applications and/or programs, databases, etc.), network servers, and the like. The subject entity may be any type of organization or business implementing any type or kind of network or computing environment. In a preferred embodiment, one or more steps of the method 200 may be implemented between a remote intelligent computer and/or cyber security platform (service) and the subject entity.

In a first implementation, S220 may function to collect security environment data of a subject entity. In a preferred embodiment, an administrator of the subject entity using a web interface or API may enable access to its security environment to a remote intelligent computer security platform. In such embodiment, the remote security platform may function to directly interface with components (e.g., devices and applications) of the security environment and acquire security environment data from the subject entity by establishing a remote communication links to a network of the subject entity. In this first implementation, S220 may function to actively and/or passively collect security environment data from the subject entity.

In a passive security environment data collection mode, S220 may function to monitor and record network and security environment activity over one or more set periods. Specifically, S220 may function to monitor activities relating to logins (e.g., authentications) to one or more networks or digital resources of the security environment, devices (e.g., computers, etc.) operating on or accessing (or attempting to access) the one or more networks or digital resources of the subject entity, general network traffic, and the like.

Additionally, or alternatively, S220 may function to set security environment data collection periods during high use of the security environment of the subject entity and/or at times at which the security environment may be most vulnerable to potential attacks. In some embodiments, the security environment data collection period is a single continuous period in which all activity data generated by the security environment of the subject entity during the period is collected or recorded by S220.

In an active security environment data collection, S220 may function to actively pursue and acquire security environment data by transmitting one or more probes and/or one or more queries to the one or more components and/or devices operating within the security environment of the subject entity. The one or more components may include software components (e.g., software applications, browsers, etc.), any endpoint devices (e.g., user computers, user mobile devices/phones, network routers, networked servers, etc.), and the like.

S220 may configure the one or more probes to automatically locate computing resources within the security environment and capture or make a request for security configuration data, historical activity or use data, endpoint health data, and the like from the one or more components and/or devices operating within the security environment. For instance, S220 make configure the one or more probes to capture data relating to any security features installed at a component, a current version of a component or a current version of software operating on a component, authentication requirements for each component, network configurations (e.g., permissible user locations for accessing the network, trusted devices policies or settings, group access policies or settings, trusted networks settings, etc.), and the like. It shall be noted that S220 may configure the probes to capture or acquire any suitable security environment data. Additionally, endpoint health and endpoint version data may be determined in accordance with the systems and methods described in U.S. patent application Ser. No. 15/139,545 and U.S. patent application Ser. No. 14/482,796, which are incorporated by reference herein in their entireties by this reference.

Additionally, or alternatively, S220 may configure and transmit queries to the one or more components and/or devices operating within the security environment of the subject entity. Additionally, or alternatively, S220 may present one or more security environment queries via a user interface or the like that is accessible to an administrator of the security environment of the subject entity. Preferably, once presented with the queries, the administrator may provide a response to the queries directly and/or redirect or point the query toward a digital resource that may include data for responding to one or more of the queries.

Some example queries may include, but are not limited to: "how mobile computing devices (e.g., mobile phones) are used in the environment?"; "what are permissible work locations?"; "what type and version of operating systems are implemented in the environment?"; "what are permissible plugins?"; "what are permissible web browsers?"; and the like.

Additionally, or alternatively, S220 may function to embed or install software agents within the one or more components of the security environment of the subject entity that are capable of collecting security data including security configurations, general operations data, and the like. The software agents may function to aggregate the security data and transmit the security data once sufficient security data has been collected back to a remote intelligent computer security platform or the like.

In a second implementation, S220 may function to identify security environment data of a subject entity based on historical authentication data or computer or security environment data acquired as a result of a use of a security service (e.g., multi-factor authentication services, etc.). In some embodiments, the subject entity may employ one or more security services or features provided by the intelligent computer security platform. Accordingly, the historical authentication data may be stored in an entity-specific repository or datastore that is maintained and/or operated by the intelligent computer security platform. The historical authentication data may include data relating to any or all authentications performed using the authentication services (e.g., multi-factor authentication services, etc.) of the intelligent computer security platform. For instance, the authentication data may include failed authentication attempts and/or successful authentication attempts to applications and networked devices of the subject entity, authentication times, authentication dates, user associated with the authentications, devices used for performing authentication, IP addresses and geographic location data of devices used for authentication, sensor data (e.g., fingerprint sensor, accelerometer, cameras, etc.) obtained from authenticating devices, endpoint health data of the devices or applications authenticating to the network and/or to applications of the subject entity, and the like. Additionally, or alternatively, the authentication data may include one or more inferences or data derived based on the collected authentication. As examples, one or more inferences from authentication may include an inference of a job of a user based on authentication data (e.g., based on a number of times a user authenticates to a job-specific application), an inference of a security risk posed by a user or device based on authentication data, and the like.

In some embodiments, S220 may include collecting security data in the form of user-submitted risk tolerance data. For example, an administrator for an entity may submit risk tolerance data that is specific to one or more applications or components in an associated security environment. The risk tolerance data can include information about which risks the subject entity considers acceptable within the security environment.

Optionally, S225, which includes augmenting the security environment data with additional security data, functions to identify additionally security data that may be related or otherwise, assistive in an assessment (as described in S230) of the security environment data of the subject entity.

In one instance, S225 may function to identify a repository of security data aggregated from a plurality of other entities. In a preferred embodiment, the repository may be a global security databank of security data collected from one or more entities implementing one or more of the security services provided by the intelligent computer security platform. Thus, over the course of using the one or more security services of the intelligent computer security platform, security environment data of these plurality of other entities may be aggregated and stored in a centralized global security databank.

Accordingly, S225 may function to identify peer entities that may be comparable in size, function (e.g., industry peers, etc.), and/or security environment to the subject entity and use the security data of the peer entities in the assessment of the security environment data of the subject entity.

Additionally, or alternatively, S225 may function to augment the security environment data of the subject entity by collecting additional security data from one or more threat intelligence feeds. The one or more threat intelligence feeds may be industry-specific feeds (e.g., within the industry of the subject entity) or global threat intelligence feeds that provide general threat intelligence data.

S230 includes analyzing the security data. In some embodiments, S230 includes analyzing the corpus of security data to determine one or more vulnerability factors and/or one or more security behaviors relating to the subject entity. In some embodiments, vulnerability factors can include potential attack vectors and predetermined risk thresholds. In some embodiments, security behaviors can include one or more current security policy configurations of the subject entity. In some embodiments, analyzing the corpus of security data can include filtering the corpus based on probative security value regarding a state of the network maintained by the subject entity. In some embodiments, probative security value can include the existence or probable existence of malicious software within the security environment. In some embodiments, analysis includes detecting one or more predetermined features of known malicious software within the security environment.

S240, which includes generating a security assessment of the corpus of security environment data of the subject entity, functions to identify a state of the security environment of the subject entity including an identification vulnerabilities and security enhancement opportunities. In a preferred embodiment, the security assessment analyzes the corpus of security environment data of the subject entity to identify potential attack vectors, risk thresholds, current security policy configurations, and security-relevant entity behaviors.

In one embodiment, S240 may function to implement a feature extractor. In one implementation, the feature extractor comprises an ensemble of specifically configured data filters that, respectively, function to extract features within the corpus of security environment data having some probative security value regarding a state of the security environment of the subject entity. For instance, a first data/feature filter may include a filter that is specifically configured to filter data that is probative of the existence of malicious software within the security environment. In such embodiments, the first data/feature filter may be configured or designed to detect features of a list of known malicious software. In another example, a second data/feature filter may include a filter that is specifically designed to filter data relating to IP addresses used by remote devices accessing the one or more networks of the security environment.

Accordingly, S240 may function to extract security feature data from the security environment data, classify the extracted security feature data according to a predetermined category (that may be defined by the type of filter used), and group together security feature data classified with a same category.

In a variant, S240 may function to implement a machine learning model or ensemble comprising one or more machine learning algorithms that are specifically trained to classify (e.g., output labels) and/or detect security features having (high) probative value from security environment data. In such variant, S220 may use the security environment data as input into the machine learning model and the machine learning model may output classification labels for or identify features of the security environment data having probative security value.

In some embodiments, the corpus of security data and resulting analysis of the security data may be used in conjunction with machine learning techniques, including trained machine learning algorithms, on one or more neural networks in order to generate the security assessment. In some embodiments, the machine learning techniques make inferences, including predictive suggestions or inferences about a state or condition of the security environment and/or characteristics or behaviors of the subject entity. In some embodiments, the trained machine learning algorithms may include deep learning or similar techniques. In some embodiments, the computer security platform may function to implement a distributed or federated machine learning model that may be deployed in different layers of the computer security platform.

The computer security platform may employ any suitable machine learning technique or algorithm, including one or more of: supervised learning (e.g, using logistic regression, back propagation neural networks, random forests, decision trees, etc.), unsupervised learning, semi-supervised learning, reinforcement learning, and any other suitable learning style. Any component of the computer security platform can implement any one or more of: a regression algorithm, an instance-based method, a regularization method, a decision tree learning method, a Bayesian method, a kernel method, a clustering method, an associated rule learning algorithm, an artificial neural network model, a deep learning algorithm, a dimensionality reduction method, and an ensemble method. The computer security platform may employ any type of one or more neural networks in any combination, including one or more of: feed forward neural networks. recurrent neural networks, deep convolutional networks, deconvolutional networks, deep belief networks, and autoencoders.

Additionally, or alternatively, S240 may function to implement a security metrics generator. Specifically, S240 may use the security metrics generator to evaluate the security environment data and generate one or more security metrics. The security metrics generator may be specifically programmed to identify measurable and/or probative security features from the security environment data and generate one or more security metrics from these identified security features. For instance, the security metrics generator may identify that the security environment data includes security relating to remote logins by various computing devices. S220, using the security metrics generator, may function to count (using counting circuitry or the like) a number of remote logins over a set period and generate a security metric relating to remote logins to the security environment (e.g., 4,777 remote logins to the security environment per 30 days). It shall be noted that the security metrics generator may be programmed to generate a metric for any type or kind of security feature.

Additionally, or alternatively, the security metrics generator may generate security metrics for each of the groups of security features identified by the security feature extractor and/or machine learning model.

In one implementation, S240 may function to generate a security risk score. A security risk score as referred to herein may generally relate to a level of risk or susceptibility of a security environment to one or more digital threats. The security risk score may additionally correspond to a likelihood or a probability that a given security environment may be subject to a cyber or digital attack due to one or more identified and/or unidentified vulnerabilities.

The security risk score may preferably be determined based on assigning weights and/or scoring algorithms to one or more security factors and/or one or more security features of a subject security environment under evaluation that contributes to the security risk score. For example, a security risk score algorithm may include software application health (e.g., whether applications are updated regularly with patches, etc.) as a first security factor and authentication requirements to software applications of a security environment as a second security factor. In this example security score algorithm, the first security factor may have a first weight and the second security factor may have a second weight that may be aggregated together (and possibly with other security factor weights) to generate a security risk score for a subject security environment.

In another implementation, S240 may generate an assessment of the subject entity's security posture based on user behavior data extracted from the security environment data and security service utilization data. The user behavior data may include data and metrics relating to how a user interacts with and uses one or more components and/or applications of the security environment. The security service utilization data may include security data collected by an intelligent computer security platform regarding a use by the subject entity of one or more security services provided by the platform. In addition to the security intelligence data collected and/or derived by the intelligent computer security platform, S240 may function to implement one or more intermediary services (e.g., external services and/or third-party services or data analysis applications integrated with the intelligent computer security platform, etc.) operating on or with the intelligent computer security platform. The one or more intermediary services may function to consume or ingest data from the security environment of the subject entity and in some embodiments, global security environment data from a collective of other entities, and produce resultant (security) analysis data (partially synthesized data) that may be used to augment the data collected and/or derived by the intelligent computer security platform. S240 may function to use the data collected from the intermediary services as input into the intelligent computer security platform for generating additional security environment data.

Additionally, or alternatively, S240 may function to identify security trends and behaviors based on an assessment of the security environment data. Specifically, S240 may function to use one or more of the identified security features and generated security metrics to develop or generate trend or behavioral graphs that illustrate a movement and/or development of specific security features, such as potential security issues or concerns, over time. Additionally, similar trends and behaviors may be generated using the security environment data of industry peers of the subject entity. In this way, S240 may include in the security environment assessment for the subject entity a comparison of the security environment of the subject entity to the security environments of other similarly-situated entities. In this way, a security performance of the subject entity relative to industry peers may be illustrated.

S240 may additionally aggregate the security assessments including one or more the generated security metrics, the generated security risk scores, the generated security trends and behaviors, and the like into a security environment assessment of the security environment of the subject entity that may be presented to an administrator of the security environment via a user interface (e.g., a security dashboard provided by the intelligent computer security platform).

S250, which includes generating computer security policy and computer security system configurations, functions to use one or more of the security environment data and the security environment assessment to generate computer security policy and computer security system configurations for a given entity.

In a preferred embodiment, S250 may function to implement a computer security engine that ingests the security environment data and other system-derived data (e.g., computer security assessments, security risk scores, etc.) and generates an output of optimal security policy and/or security configurations for a specific entity (e.g., a subject entity). In general, the generated or proposed security policy may indicate security requirements that, when implemented, govern a manner in which users of a security environment authenticate, geographic locations including acceptable IP addresses for authentication and/or access to resources of an environment, types or kinds of devices that may be used to authenticate and/or access computing and/or digital resources of the environment. The proposed security policies and security configurations may include requirements that may be applied system-wide, per application, per user, per groups of users, per device, per groups of devices, and the like.

For example, S250 may function to generate proposed computer security policy to restrict a class of devices from accessing a computing environment of the subject entity after determining from an assessment of the security environment data and/or learning over a period of evaluating the computing environment (e.g., from tracking device behavior and from inferences relating to the subject entity's risk thresholds) that the class of devices would be unexpected and potentially undesirable in the environment.

In a variant, S250 may function to crowdsource common or standard computer security configurations and integrate one or more of the crowd-sourced computer security configurations as a recommendation to the subject entity. In some embodiments, S250 may function to identify errors and/or discrepancies within crowd-sourced or common configurations to an administrator in order to better evaluate and differentiate platform-generated computer security policy and configuration proposals.

In yet another variant, S250 may function to generate computer security policy and/or computer security configurations based on collaborative filtering and/or clustering using computer security policy and configurations from disparate entities having satisfactory security health scores. In such embodiments, S250 may function to identify a plurality (group) of disparate entities having a satisfactory security health score (e.g., a security health score that satisfies a minimum-security health threshold, etc.) and further function to filter common or reoccurring computer security policy and/or computer security configurations from the group of disparate entities. Additionally, or alternatively, S250 may function to apply a clustering technique that clusters or aggregates together common or reoccurring computer security policy and/or computer security configurations from the group of disparate entities. Once S250 identifies a filtered set or clustered groups of computer security policy and/or configurations, S250 may function to generate one or more computer security policy and/or one or more computer security configurations based on the filtered set or clustered groups. In a specific example, the method can include: determining a cluster for the subject entity (e.g., based on security parameter values, the security environment, security data, security behavior, applications used, devices secured, industry, security assessment, etc.), identifying entities having satisfactory security scores within the cluster (e.g., scores above a threshold for one or more metrics), and generating a computer security policy and computer security system configurations based on the identified entities' security policies and/or computer security system configurations (e.g., recommending the identified entities' security policies and/or computer security system configurations to the user; synthesizing the identified entities' security policies and/or computer security system configurations to the user based on user needs; etc.). However, S250 can be otherwise performed.

S250 may additionally present the proposed security policy and proposed security configurations via a user interface. S250 may function to generate rationale that accompanies each of the security proposals indicating a research-based justification (e.g., industry best practices, etc.) for the security proposals.

Additionally, or alternatively, S250 identify comparable industry peers or the like and generate comparisons of a current security environment of the subject entity and the security environments of industry peers to illustrate security gaps and differences in security configurations and security policy. Additionally, or alternatively, the user interface may also illustrate a trend analysis over time of changes in one or more security factors or security features of the security environment that may additionally be compared to security trends of comparable entities or industry peers.

Additionally, or alternatively, S250 may function to provide via the user interface one or more selectable input features or input boxes that enables an administrator to accept or decline proposed security policy and proposed security configurations. In some embodiments, an acceptance by an administrator of a proposed security policy and/or a proposed security configuration may trigger an automatic implementation of the proposed security policy and/or proposed security configuration to the security environment of the subject entity without any additional intervention by the administrator. That is, an acceptance by the administrator preferably triggers the intelligent computer security platform to automatically modify security policy (if any) and/or modify security configurations of the security environment (e.g., networked devices, network applications, etc.) to be in alignment with the proposed security policy and proposed security configurations, as described in S270.

Additionally, or alternatively, an acceptance and preview request of a proposed security policy and proposed security configurations may function to trigger an automatic implementation of a security policy simulator. Specifically, S250 may function to use the security policy simulator to generate one or more simulations (e.g., computer models) of how the proposed security policy and/or the proposed security configurations would perform within the security environment of the subject entity. Accordingly, S250 may function to provide historical security environment data as simulator input into the simulator to determine how the proposed security policy and/or the proposed security configurations would have performed.

The resultant simulator data may include data that identifies a number of users and/or devices that may have been able to successfully authenticate into (or login) to the environment of a subject entity as well as a number of users and/or device that have been disallowed from accessing the environment (e.g., digital resources, devices, network(s), etc.) of the subject entity. Additionally, or alternatively, the simulator may function to simulate the effects of implementing the security policy and/or configurations with respect to the administrator of the security environment. In this way, the simulator may illustrate whether one or more of the security policies or configurations may inadvertently prevent access to the security environment by the administrator based on the historical activity data (e.g., authentication data, login data, etc.) of the administrator within the security environment.

Additionally, or alternatively, S250 may function to use the resultant simulator data to extrapolate or predict results of implementing the proposed security policy and/or proposed security configurations within the security environment.

If an administrator declines a computer security proposal, S250 may function to generate additional computer security proposals that may include computer security proposals with more stringent security policy and security configurations and/or computer security proposals with more lenient security policy and security configurations relative to the original computer security proposals that may have been declined by the administrator.

In a variant, S250 may enable an administrator of a security environment to provide input of a security risk tolerance and generate one or more proposals for computer security policies and/or computer security configurations based on the security risk tolerance input and/or the security environment data (including global security data sources and intelligence threat feeds, etc.). In some embodiments, the risk tolerance input provided by the administrator may be specific to one or more applications or components in an associated security environment. Alternatively, the risk tolerance input by the administrator may broadly apply to the overall security environment.

In a further variant, S250 may function to implement a user interface presenting one or more predetermined security environment queries to an administrator (e.g., a non-expert) of a security environment. S250 may function to collect the response data and convert the response data to input for an expert system, such as an artificially intelligent security system, that functions to generate (or infer) one or more security policy and/or security configurations based on the response data. The expert system may be any suitable artificially intelligent computer system that may function to implement one or more machine learning algorithms or knowledge base (e.g., facts and/or predetermined rules) for policy decisioning.

Optionally, S260 includes providing a security policy recommendation. In some embodiments, the security policy recommendation is provided to the subject entity and incorporates at least a subset of the generated computer security policy. In some embodiments, the security policy recommendation includes the computer security platform sending a prompt requesting a user, administrator, or other entity or representative of an entity to approve and/or accept the security policy recommendation. The entity may, in various embodiments, approve and/or accept the security policy recommendation, decline to accept, or adjust one or more components of the recommendation or generated computer security policy. In some embodiments, in response to an approval response, the computer security platform implements the recommendation. In some embodiments, in response to the subject entity declining to accept, one or more alternative recommendations are provided to the subject entity.

S270 optionally includes implementing the computer security policy and configuring the computer security system, in response to an acceptance of a computer security proposal. In some embodiments, at least a subset of the generated computer security policy is implemented, including one or more computer security configurations. In some embodiments, S270 may function to automatically implement the computer security policy changes and the computer security configuration changes to the security environment of the subject entity. In some embodiments, S270 may function to deploy one or more security applications that may be automatically installed on the relevant endpoint devices and/or components of a security environment. In some embodiments, S240 may function to deploy new and/or security authentication measures, such as two-factor authentication, that requires users and/or devices accessing network resources (e.g., networked devices or network applications) of the environment of the subject entity to successfully authenticate for gaining access. In some embodiments, S270 may designate trusted and untrusted devices and restrict access to the resources of the computing environment of the subject entity based on the designations (e.g., restrict untrusted devices).

Figure 4A:
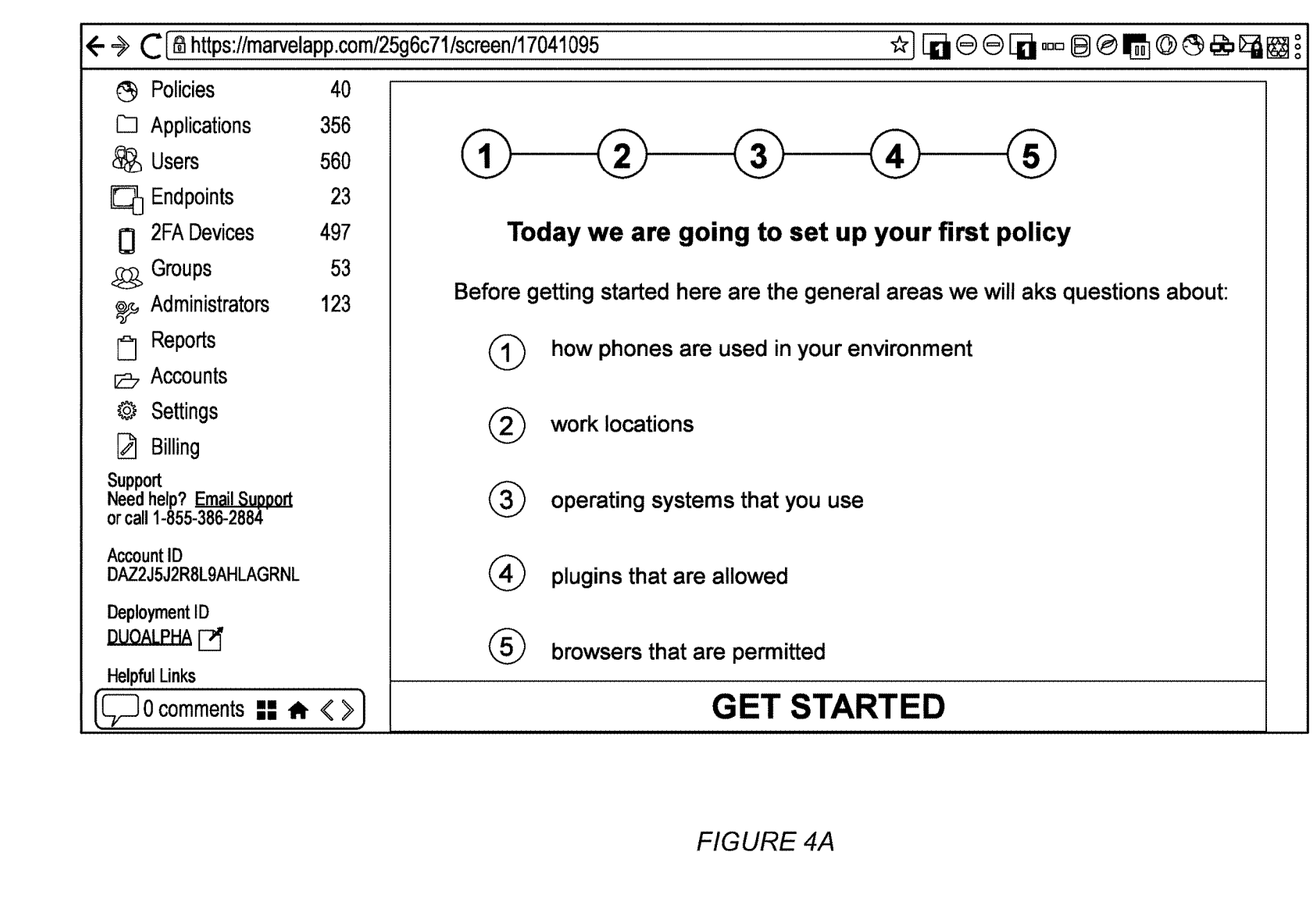
FIG. 4A illustrates an example workflow in accordance with one or more embodiments of the present application.

FIG. 4A illustrates an example workflow in accordance with one or more embodiments of the present application. In the illustrated example, a user interface is presented to an administrator associated with a subject entity. In this example, the subject entity has just created an account within the computer security platform and has not yet set up a security policy or configured any aspect of security within the computer security platform. The user interface is presented once the administrator is authenticated and registered. The message "Today we are going to setup your first policy" is presented, and the administrator is informed about a series of questions that the computer security platform will present to the user. The questions relate to the security environment of the user and seek to collect security data about the subject entity and the security environment of the subject entity. Questions ask for details about phone usage within the environment (i.e., networked devices), work locations, operating systems used within the environment, allowed scripts or applications, allowed browsers within the environment, and more. Once the administrator responds to the questions, the computer security platform can collect this security data to add to a corpus of security data about the subject entity, analyze the corpus, generate an assessment of the security environment, generate a computer security policy based on the assessment, and then provide a recommendation for the new subject entity to configure and implement its first computer security policy within the computer security platform. In some embodiments, the questions are augmented with additional data, including global, aggregated security data on the policies of multiple additional subject entities that are similar to the subject entity. In some embodiments, the questions are further augmented with historical authentication data of similar subject entities and security knowledge the computer security platform has acquired in the process of setting up additional subject entities.

Figure 4B:
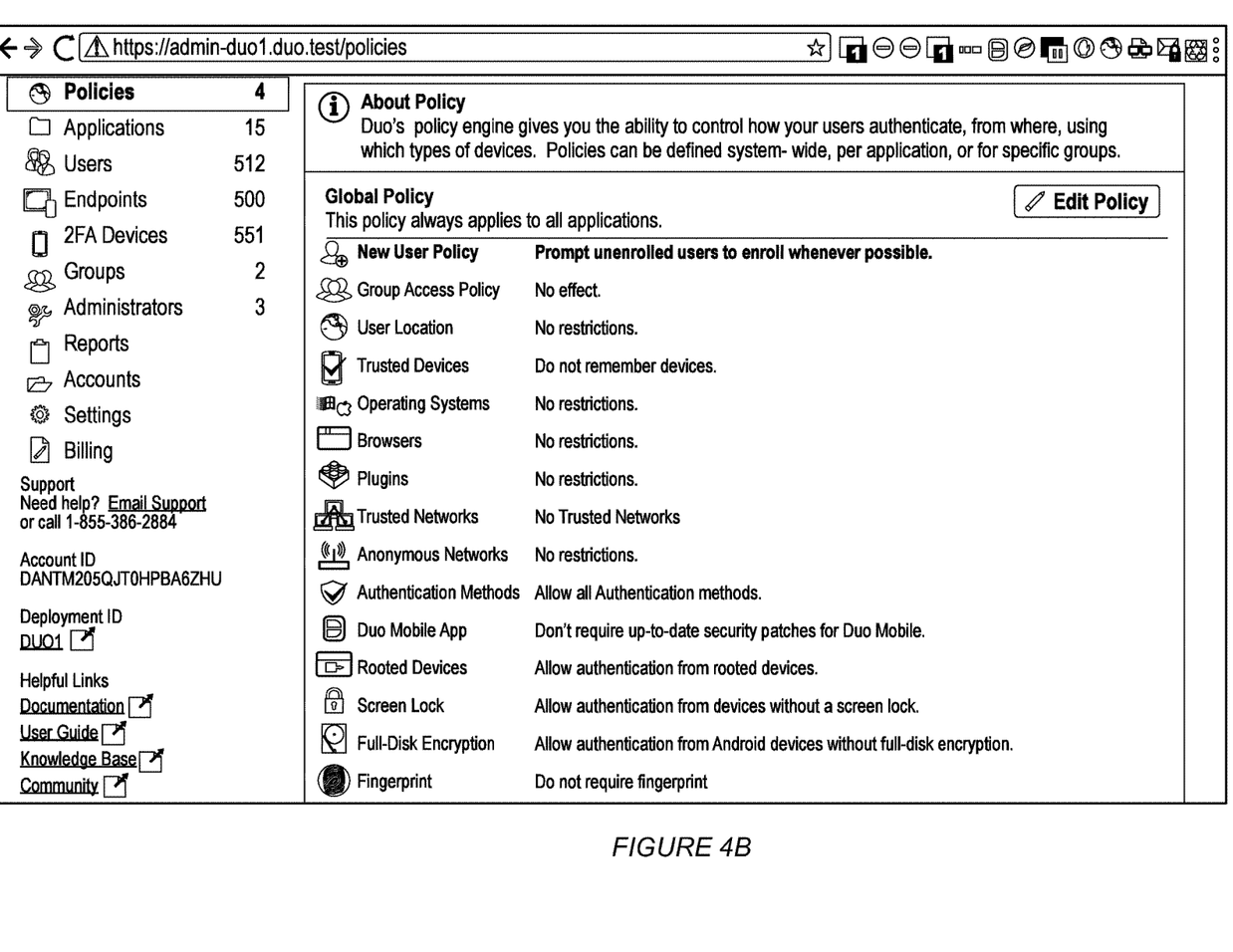
FIG. 4B illustrates an example workflow in accordance with one or more embodiments of the present application.

FIG. 4B illustrates another example workflow in accordance with one or more embodiments of the present application. In the illustrated example, information regarding a generated computer security policy is displayed in a user interface. A new security policy recommendation is provided to an administrator of the subject entity as "New User Policy". The new recommendation is based on collected security environment data and authentication data from the security environment of the subject entity. The administrator has the option to edit the policy, including adjusting several components of the security policy and making a decision regarding the security policy recommendation, such as approving, declining to approve, and/or adjusting the security policy recommendation to better suit the subject entity's needs.

The method of the preferred embodiment and variations thereof can be embodied and/or implemented at least in part as a machine configured to receive a computer-readable medium storing computer-readable instructions. The instructions are preferably executed by computer-executable components preferably integrated with a system for identifying phishing websites and hindering associated activity. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for configuring computer security of a subject entity at a computer security platform, the method comprising:
   monitoring a security environment maintained by the subject entity;
   collecting a corpus of security data, the security data comprising security environment data relating to one or more security configurations of a network maintained by the subject entity;
   analyzing the corpus of security data to determine one or more vulnerability factors and one or more security behaviors relating to the subject entity;
   generating a security assessment for the subject entity based on the analysis of the corpus of security data;
   generating a computer security policy for the security environment based on the security assessment, comprising one or more computer security configurations;
   providing, to the subject entity, a security policy recommendation incorporating at least a subset of the generated computer security policy;
   receiving a recommendation response from the subject entity declining to accept the security policy recommendation; and
   responsive to the recommendation response declining to accept the security policy recommendation, providing an alternative security policy recommendation to the subject entity based on the recommendation response.

2. The method of claim 1, wherein analyzing the corpus of security data, generating the security assessment, and/or generating the computer security policy comprises performing one or more machine learning techniques on one or more neural networks.

3. The method of claim 1, wherein monitoring the security environment comprises monitoring authentication activity within the security environment.

4. The method of claim 1, wherein the corpus of security data further comprises historical authentication data relating to one or more authentications performed using authentication services of the computer security platform.

5. The method of claim 4, wherein the authentication services comprise multi-factor authentication services.

6. The method of claim 1, wherein the security data further comprises global security environment data aggregated from a plurality of additional subject entities.

7. The method of claim 1, wherein the security data further comprises user-submitted risk tolerance data.

8. The method of claim 1, wherein the security data comprises one or more current security policy configurations of the subject entity.

9. The method of claim 1, wherein the vulnerability factors comprise one or more attack vectors.

10. The method of claim 1, wherein analyzing the corpus of security data comprises filtering the corpus of security data based on probative security value regarding a state of the network maintained by the subject entity.

11. The method of claim 10,
wherein probative security value relates at least to a probability of the existence of that malicious software exists within the security environment, and
wherein analyzing the corpus of security data further comprises detecting one or more predetermined features of known malicious software within the security environment.

12. The method of claim 1, wherein generating the security assessment comprises generating a risk score for the security environment.

13. The method of claim 1, wherein generating the computer security policy comprises generating one or more crowd-sourced computer security configurations.

14. The method of claim 1, further comprising:
receiving a second recommendation response from the subject entity accepting the alternative security policy recommendation; and
implementing at least a subset of a computer security policy of the alternative security policy recommendation, based on the second recommendation response.

15. The method of claim 1, further comprising:
receiving a second recommendation response from the subject entity adjusting one or more components of the alternative security policy recommendation; and
implementing at least a subset of the adjusted security policy of the alternative security policy recommendation, based on the second recommendation response.

16. A system for configuring computer security of a subject entity, the system comprising:
a security environment maintained by the subject entity; and
a computer security platform implemented via one or more web servers or a distributed computing system, the one or more web servers or the distributed computing system comprising a non-transitory computer-readable medium storing computer instructions that when executed by one or more computer processors enables the computer security platform to:
collect a corpus of security data, the security data comprising security environment data relating to one or more security configurations of the security environment maintained by the subject entity;
analyze the corpus of security data to determine one or more vulnerability factors and one or more security behaviors relating to the subject entity;
generate a security assessment for the subject entity based on the analysis of the corpus of security data;
generate a computer security policy for the security environment based on the security assessment, comprising one or more computer security configurations; and
provide, to the subject entity, a security policy recommendation incorporating at least a subset of the generated computer security policy;
receive a recommendation response from the subject entity declining to accept the security policy recommendation; and
responsive to the recommendation response declining to accept the security policy recommendation, provide one or more alternative security policy recommendations to the subject entity based on the recommendation response.

* * * * *

UNITED STATES PATENT AND TRADEMARK OFFICE
CERTIFICATE OF CORRECTION

PATENT NO. : 10,412,113 B2
APPLICATION NO. : 16/215103
DATED : September 10, 2019
INVENTOR(S) : Michael Hanley et al.

It is certified that error appears in the above-identified patent and that said Letters Patent is hereby corrected as shown below:

In the Claims

Column 15, Claim 11, Line 3:
After "probability", delete "of the existence of"

Column 16, Claim 16, Line 20:
After "configurations;", delete "and"

Signed and Sealed this
Thirty-first Day of December, 2019

Andrei Iancu
*Director of the United States Patent and Trademark Office*